United States Patent [19]
Peterson

[11] 3,719,170
[45] March 6, 1973

[54] MOVABLE FEED BUNK
[76] Inventor: Maurice L. Peterson, Kerkhoven, Minn. 56252
[22] Filed: Feb. 18, 1971
[21] Appl. No.: 116,538

[52] U.S. Cl. ............................................. 119/52 AF
[51] Int. Cl. .............................................. A01k 05/02
[58] Field of Search ............. 119/52 AF, 52 B, 51 R

[56] References Cited

UNITED STATES PATENTS

| | | | |
|---|---|---|---|
| 3,252,444 | 5/1966 | Haen | 119/52 B |
| 2,797,663 | 7/1957 | Bailey | 119/52 B |
| 1,518,664 | 12/1924 | Maryott | 119/51 R X |
| 3,581,712 | 6/1971 | Ferris | 119/52 B |
| 2,987,040 | 6/1961 | Piel | 119/52 AF |
| 3,123,050 | 3/1964 | Haen | 119/52 B |
| 2,800,106 | 7/1957 | Nelson | 119/52 AF |
| 3,266,462 | 8/1966 | Fulton, Jr. et al. | 119/52 AF |

*Primary Examiner*—Hugh R. Chamblee
*Attorney*—Burd, Braddock & Bartz

[57] ABSTRACT

An animal and poultry feeding apparatus having feed bunks movably suspended from an overhead rail. A plurality of spaced U-shaped hangers, longitudinally spaced from each other with rigid struts, support upright suspension members connected to the ends of the feed bunks. The suspension members each have a flexible cable and a winch so that the elevation of the feed bunks can be changed. An elongated chain supported on the hangers and connected to the end hangers is trained over a motor driven wheel. Rotation of the wheel moves the chain pulling the end hangers toward the wheel, thereby moving the feed bunks along the rail.

14 Claims, 13 Drawing Figures

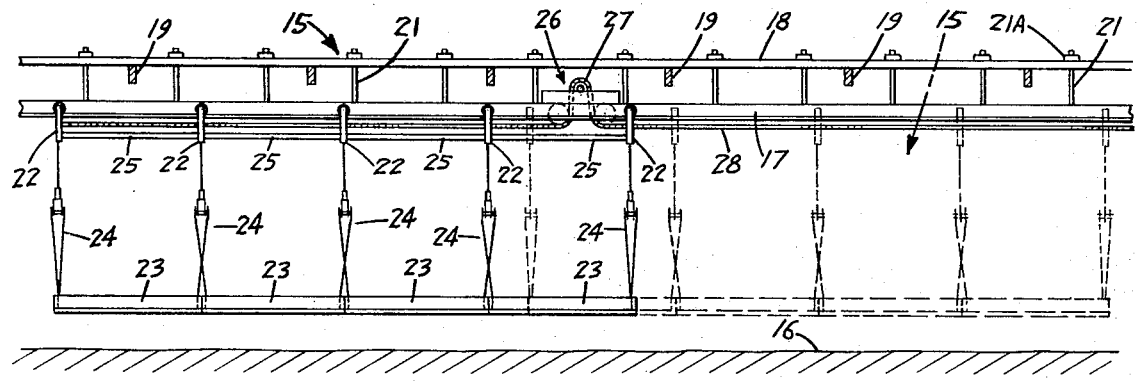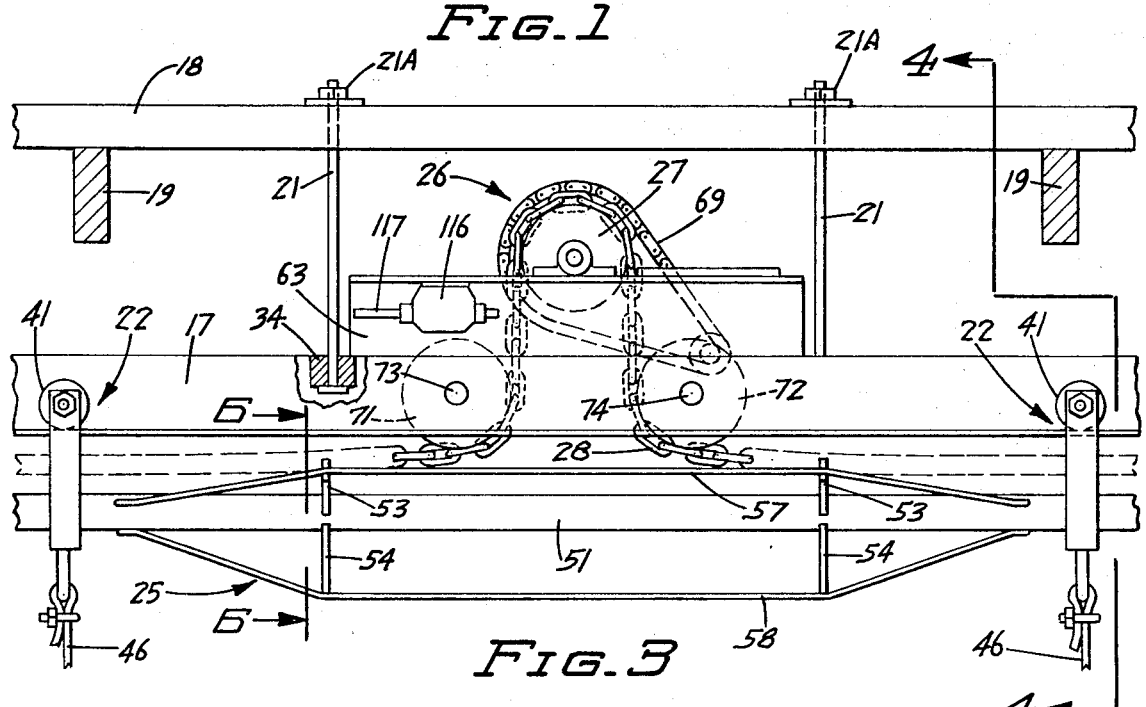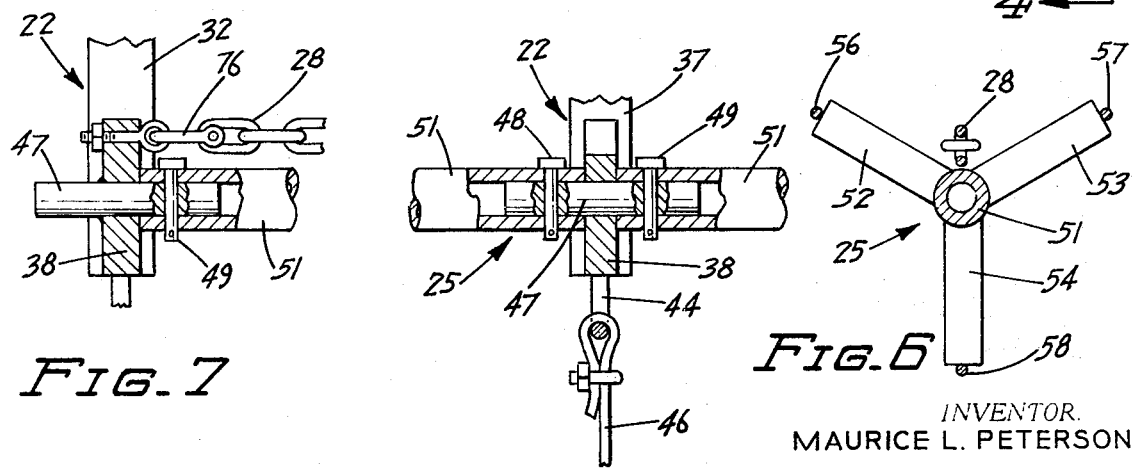

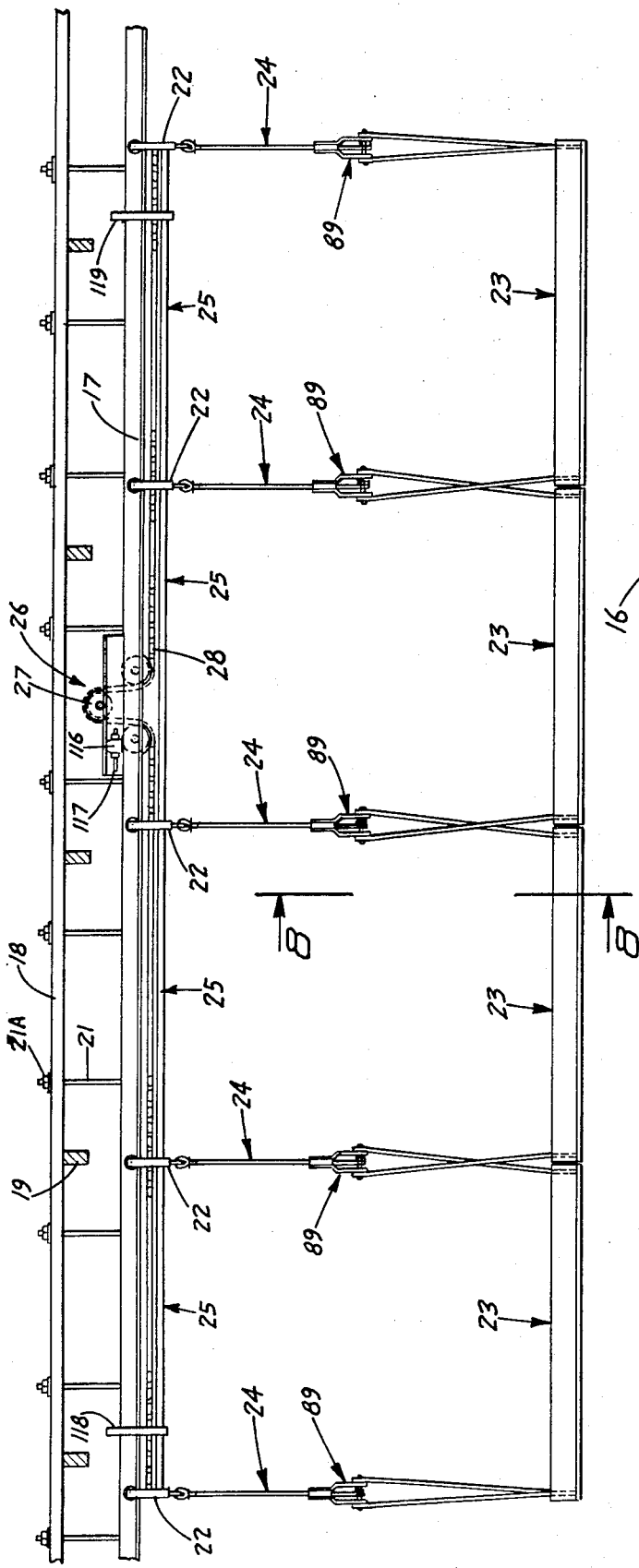
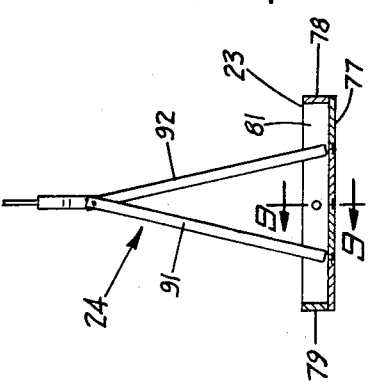
INVENTOR.
MAURICE L. PETERSON
BY
Burd, Braddock & Barty
ATTORNEYS

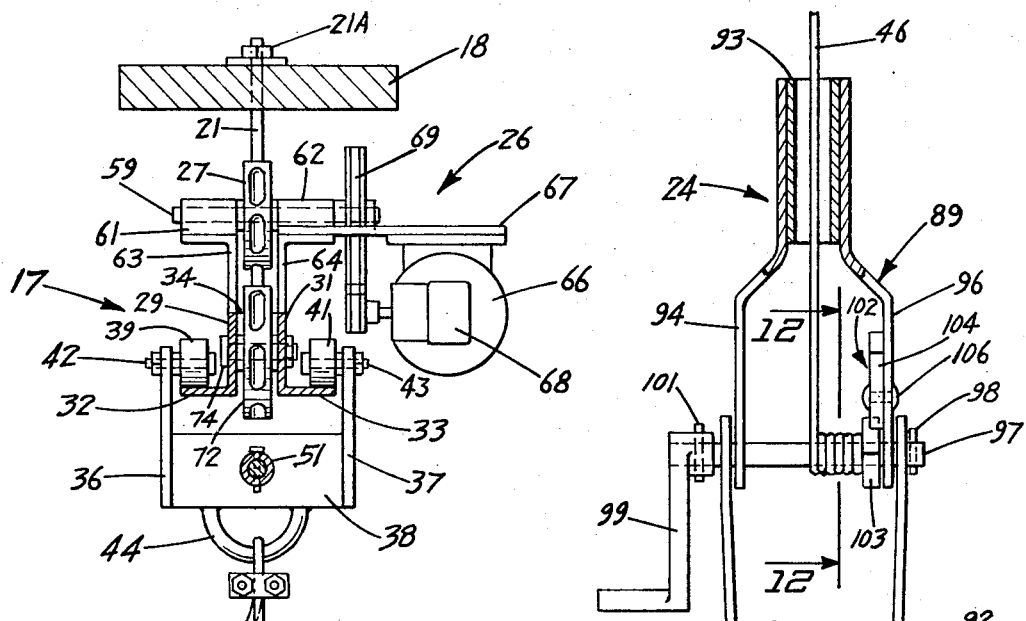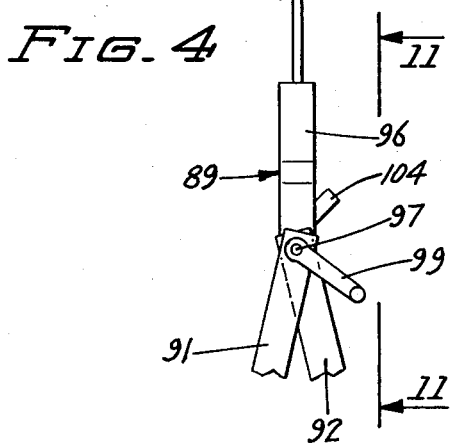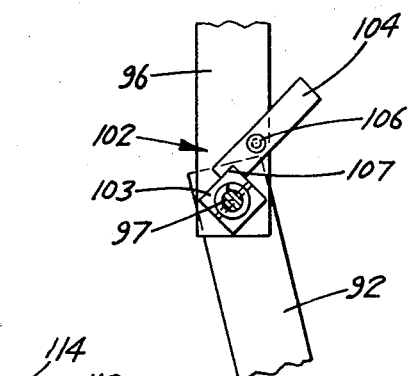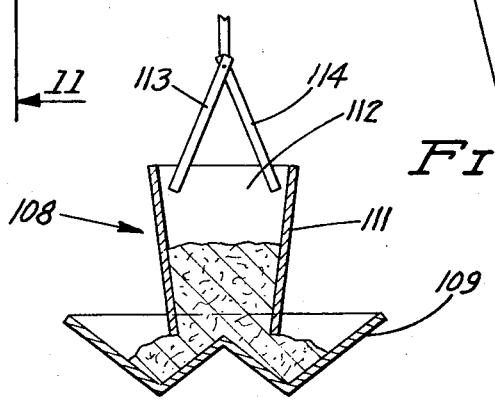

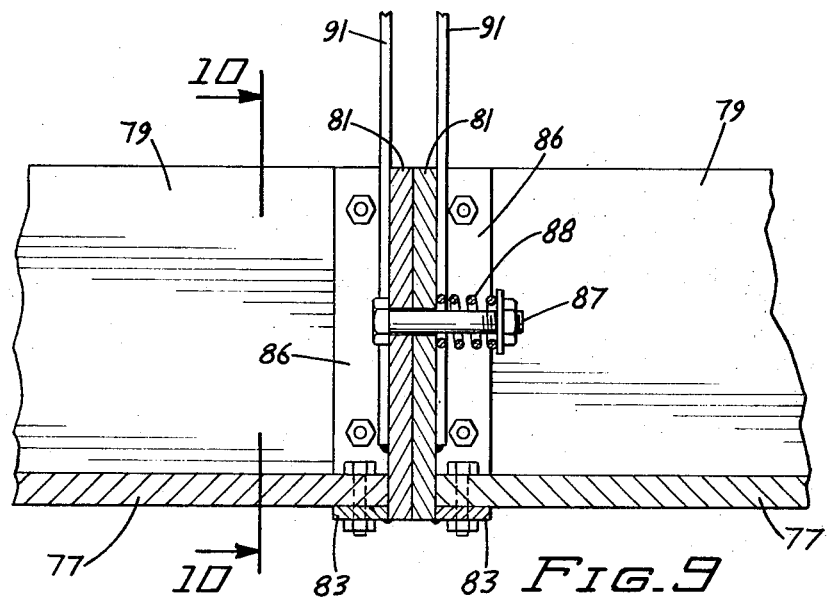
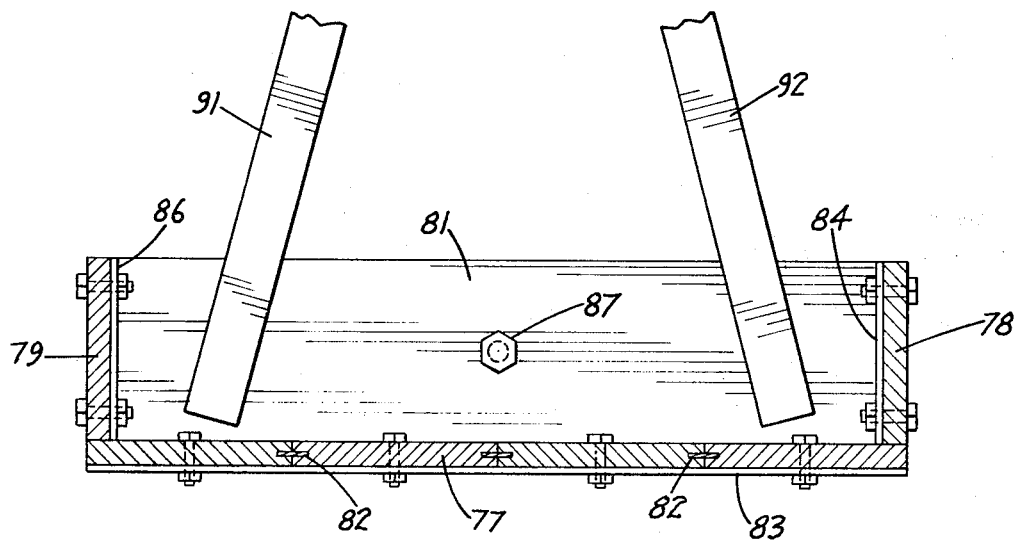

MOVABLE FEED BUNK

BACKGROUND OF INVENTION

Monorail livestock feeders have been used to carry feed from a storage location to a feed lot. The U. S. Pat. to Maryott, No. 1,518,664, shows a livestock feeding apparatus having a plurality of feed bunks carried on an overhead rail. A power driven drum is used to drive a cable connected to the feed bunks to move the bunks along the rail. The U. S. Pat. to Martin No. 2,685,863, and Bailey No. 2,797,663, show monorail livestock feeders having feed hoppers connected to carriages rotatably mounted on longitudinal rails. Each carriage has drive wheels propelling the carriage along the rail. These feeders are relatively inefficient in operation, in that they require a considerable amount of power and do not effectively move the feed bunks under heavy loads and adverse weather conditions. Furthermore, these feeders require an excessive number of parts and long power transmitting members.

SUMMARY OF INVENTION

The invention relates to a feeding apparatus having feed carrying means movably mounted on an overhead or monorail. A plurality of hanger means, movably carried on the rail, support the feed carrying means above the surface of a feeding lot. A drive means is operable to move the feed carrying means and hangers relative to the rail, whereby the feed carrying means can be moved to selective locations in the feed lot. The drive means has a power driven wheel means cooperating with an elongated flexible element connected to at least one of the hanger means. The elongated flexible element is trained over the wheel means so that upon rotation of the wheel means, power is transmitted through the flexible element to the hanger means by moving the hanger means on the rail means. Rigid strut means extend between and are connected to the adjacent spaced hanger means. The strut means, in addition to maintaining the longitudinal space between the hanger means, also transmits force to the hanger means so that all of the hanger means are simultaneously moved by the action of the flexible element. An electric motor, with suitable power transmitting means, is used to drive the wheel means. A reversing switch, actuated in response to the position of the feeder, is used to automatically reverse the direction of the drive wheel means and thereby move the feed carrying means back to its initial position.

An additional feature of the invention is the use of an adjustable suspension structure operable to change the elevation of the feed carrying means to a selected height. This structure is also removable so that different types of feed carrying means can be used in the feeding apparatus. This permits the same feeding apparatus to be used on cattle, hogs and poultry.

An object of the invention is to provide a monorail feeding apparatus with an efficient, low power drive structure capable of moving feed carrying bunks to selected locations relative to the rail under heavy loads and adverse weather conditions. A further object of the invention is to provide a feeding apparatus which has a minimum number of parts and can be readily converted to different types of livestock and poultry feeding. IN THE DRAWINGS FIG. 1 is a side elevational view of the feeding apparatus of the invention showing selected positions of the feed bunks relative to the supporting overhead rail;

FIG. 2 is an enlarged side elevational view of the feeding apparatus of FIG. 1;

FIG. 3 is an elevational view of the drive mechanism for moving the feeder on the rail;

FIG. 4 is a sectional view taken along the line 4—4 of FIG. 3;

FIG. 5 is an enlarged sectional view of a hanger showing the connection of the struts to the hanger;

FIG. 6 is an enlarged sectional view taken along the line 6—6 of FIG. 3;

FIG. 7 is a sectional view of an end hanger showing the connection of the chain to the hanger;

FIG. 8 is a sectional view taken along the line 8—8 of FIG. 2;

FIG. 9 is a sectional view taken along the line 9—9 of FIG. 8;

FIG. 10 is a sectional view taken along the line 10—10 of FIG. 9;

FIG. 11 is an enlarged sectional view taken along the line 11—11 of FIG. 4;

FIG. 12 is a sectional view taken along the line 12—12 of FIG. 11; and

FIG. 13 is a transverse sectional view of a modified feed bunk.

Referring to the drawings, there is shown in FIG. 1 a feeding apparatus of the invention, indicated generally at 15, positioned in a feeding lot 16. The feeding apparatus 15 has an overhead or monorail structure 17 connected to a supporting beam 18. A plurality of spaced cross members 19 hold the support beam at an elevation above the feeding lot 16. A plurality of spaced upright rods 21 connect the overhead rail 17 with the support beam 18. As shown in FIG. 2, the rods 21 extend through the beam 18 and carry nuts 21A. The nuts 21A, being threaded on the rods 21, are used to level the overhead rail 17.

Movably supported on the rail 17 are a plurality of longitudinally spaced hanger units, indicated generally at 22, for moving the feed carrying bunks or containers 23. An upright suspension structure 24 is used to connect the hanger units with the bunks 23. Extended between adjacent hanger units 22 are rigid struts 25 which maintain the longitudinal spacing between adjacent hanger units and transmit force from one hanger unit to another hanger unit.

The hanger units and associated feed carrying bunks are moved relative to the rail with a drive assembly, indicated generally at 26. The drive assembly 26 has a driven wheel means 27 cooperating with an elongated flexible element or chain 28 for moving the feed carrying bunks 23. The flexible element is secured to the end hanger units 22 and is carried by the intermediate hanger units and the rigid struts 25. The flexible element 28 can be cable or rope trained about a driving wheel or capstan.

Referring to FIG. 4, there is shown the overhead rail 17 comprising a pair of laterally spaced linear angle members 29 and 31. These angle members have outwardly directed horizontal flanges 32 and 33 having upper riding faces for the hanger units. As shown in FIG. 3, spacer blocks 34 are located between and secured to the angle members. These blocks have upright holes for accommodating the lower portions of the upright rods 21.

The hanger units 21 ride on the flanges 32 and 33. As shown in FIG. 4, hanger unit 22 has a pair of laterally spaced upright side plates 36 and 37 attached to a transverse cross plate 38 forming a generally U-shaped structure. Rotatably mounted on the upper ends of the side plates 36 and 37 are rollers 39 and 41 which ride on top of the flanges 32 and 33 respectively. Axles 42 and 43 are secured to the side plates 36 and 37 and extend inwardly over the flanges 32 and 33. The rollers 39 and 41 are rotatably mounted on the axles. Secured to the bottom edge of the cross plate 38 is a U-shaped loop 44 carrying a cable 46 forming part of the suspension structure 24.

Referring to FIG. 5, a horizontal finger or stud 47 extends through a hole in the cross plate 38. The stud 47 is secured by welds or the like to the cross plate. The ends of the rigid struts 25 telescope over the stud 47 and are secured thereto with pins 48 and 49.

The rigid compression struts 25 comprise elongated central tubular members or pipes 51 connected to adjacent hanger units 22 in the manner shown in FIG. 5. Each pipe has two sets of three outwardly directed arms 52, 53 and 54. As shown in FIG. 6, arms 52 and 53 extend in an upward and outward direction. Arm 54 extends in a downward direction. Secured to the outer ends of the arms and end portions of the pipe 51 are rods 56, 57, and 58. These rods minimize the flexing and bending of pipe 51 during the time the strut is used to push the adjacent hanger unit. The flexible element or chain 28 is held in position along the bottom of the rail 17 by the upper arms 52 and 53 and pipe 51.

As shown in FIG. 4, drive assembly 26 has a transverse shaft 59 carrying the drive wheel means 27. The drive wheel means is a pocket wheel for carrying the chain 28 (not shown). Shaft 59 is rotatably mounted in a pair of bearings 61 and 62 mounted on angle support members 63 and 64. Support angle members 63 and 64 are secured to the top of the rail angle members 29 and 31 in approximately the middle of the angle members. This mounts the drive assembly 26 directly on the overhead rail 17. Power is supplied to the driven wheel means 27 with an electric motor 66 secured to a transverse plate 67. The plate 67 is attached to the top of the members 63 and 64. Mounted on the motor 66 is a gear reducer 68. A chain and sprocket drive 69 transmits power from the gear reducer 68 to the shaft 59.

The flexible chain 28 is trained over the pocket drive wheel 27 and around longitudinally spaced idler wheels 71 and 72. Transverse axles 73 and 74 rotatably mount the wheels 71 and 72 on the rail angle members 29 and 31. Opposite ends of the flexible chain 28 are attached to the end hangers 22. As shown in FIG. 7, a connector 76, as an eyebolt and clevis, is used to attach the end of the flexible chain 28 to the cross plate 38 of the hanger unit 22. Other types of connectors can be used to attach the flexible element 28 to the end hangers of the feeding apparatus.

The feed carrying containers 23, as shown in FIGS. 8, 9, and 10, are individual open top boxes or bunks supported in and end-to-end relative relationship by the suspension structures 24. The bunks are identical in structure. The following description is limited to a single bunk.

The bunk has a bottom 77 and upright side walls 78 and 79. The bottom and side walls are attached to transverse upright end walls 81. The bottom 77 comprises a plurality of side-by-side members, as planks. Longitudinal splines 82 fit into suitable grooves in the adjacent edges of the planks to provide a feed tight bottom. The end walls have a transverse bottom lip 83 supporting the ends of the bottom 77 and upwardly directed flanges 84 and 86 attached with suitable nuts and bolts to the ends of the side walls 78 and 79. An additional cross supporting structure (not shown) can be used between the ends of the bunk for the bottom and side walls. The bunks are maintained in end-to-end relationship with a nut and bolt assembly 87 extended centrally through the end walls 81. A coil spring 88 is used in conjunction with the nut and bolt assembly 87 to provide for limited flexing movement between adjacent bunks.

Referring to FIGS. 4, 11, and 12, there is shown a hoist assembly, indicated generally at 89, forming part of the suspension structure 24. Straps 91 and 92, secured at their lower ends to the end plates of the bunk, are attached to the hoist assembly. The hoist assembly 89 has a generally upright tube 93 secured to downwardly directed side straps 94 and 96. A transverse shaft 97 is rotatably mounted on the lower end of the straps. The cable 46 extends through the tube 93 and is attached to the shaft 97. Upon rotation of the shaft 97, the cable will either wind on the shaft or unwind from the shaft. The upper ends of the bunk straps 91 and 92 are fitted on the shaft 97. A pin 98, through one end of the shaft 97, maintains the strap 92 in assembled relation with the shaft 97. A crank arm 99 is attached to the opposite end of the shaft 97 with a transverse pin 101. The pin 101 can be removed so that the crank can be used with other hoist assemblies of the feeding apparatus.

The shaft 97 can be locked against rotation with a latch, indicated generally at 102. The latch 102 comprises a square member 103 fixably mounted on the shaft 97. Cooperating with the square member is a pawl 104. A pivot member 106 rotatably mounts the pawl 104 on the strap 96. The lower end of the pawl has a right angle cutout corner 107 which is adapted to engage a corner of the square member 103, as shown in FIG. 12, to prevent rotation of the shaft 97 in a clockwise direction. This prevents the cable 46 from unwinding from the shaft 97. The shaft is rotated to either raise or lower the feed bunks 23 to their desired position. The crank 99 is used to manually raise and lower the feed bunks by changing the length of the cable 46. The latch 102 is operative to hold the shaft 97 in a selected position.

Referring to FIG. 13, there is shown a feed bunk, indicated generally at 108, designed for hogs or poultry. This feed bunk can be attached to the hoist assembly 89. Since the hoist assembly is operable to adjust the height of the bunk, the bunk can be lowered to the proper elevation for hogs or poultry. Feed bunk 108 has an elongated bottom trough 109. The trough has a flat W-shaped cross section. Extended upwardly from the center portion of the trough is an outwardly divergent hopper 111 for storing feed. The hopper 111 has upright end walls 112. Upright straps 113 and 114, secured to the end walls, are used to attach the feed bunk to the transverse shaft 97 of the hoist assembly.

The motor 66 can be automatically operated through the use of a reversing switch 116 mounted on the angle member 63 shown in FIGS. 2 and 3. Reversing switch 116 has a sliding rod actuator 117 positioned for horizontal movement to reverse the power to the motor 66. As shown in FIG. 2, upright stop arms 118 and 119 are secured to opposite end portions of the struts 25 connected to the end hanger units 22. The stop arms 118 and 119 extend upwardly from the rigid struts 25 adjacent the rail 17. The upper ends of the stop arms are in longitudinal alignment with the sliding rod actuator so that upon movement of the arms along the rail 17, the actuator will move and reverse the switch 116. This will change the direction of the movement of the feeding apparatus. A manually controlled switch (not shown) can be used to control the power to the switch 116. A remote or manual control switch can also be used to directly control and reverse the motor.

In use, upon operation of the motor 66, the pocket wheel or drive wheel means 27 will be rotated, thereby pulling the elongated flexible element 28. Since the end of the flexible element is attached to the last hanger unit 22, the flexible element will pull the hanger unit toward the central location of the drive assembly 26. The rigid compression struts 25 push the forwardly located hanger units so that the entire bunk feeding apparatus will move along the rail 17. This changes the location of the bunks 23, for example, from the full line position shown in FIG. 1 to the dotted line position so that feeding can be accomplished in at least two locations in the feed lot. When the stop arm 118 reverses the switch 116, the motor 66 will drive the wheel means 27 in a reverse direction and thereby pull the hanger units 22 in the opposite direction. The bunks 23 will continue to move until the source of power to the motor 66 is terminated.

Different styles and lengths of bunks can replace the bunks 23. This is done by merely detaching the straps 91 and 92 from the shaft 97 and connecting the straps for the new bunks on the shaft 97. The hoist assembly 89 is then used to adjust the elevation of the new bunks according to the requirements of the livestock or fowl.

The above description and drawings are directed to a preferred embodiment of the invention. It is to be understood that changes in the type of rail, hanger structure, drive assembly, feed bunks and other parts of the feeding apparatus may be made without departing from the scope of the invention. For example, the number of feed bunks may vary from a single feed bunk to a plurality of bunks.

The embodiments of the invention in which an exclusive property or privilege is claimed are defined as follows:

1. A feeding apparatus comprising: feed bunk means for holding feed in a position where it is accessible to animals or poultry, an elongated rail means located above a surface of a feeding location for establishing a path of movement of the feed bunk means, a plurality of spaced hanger means movably supported on the rail means, suspension means connecting the feed bunk means and hanger means, said feed bunk means supported by the hanger means and suspension means at an elevation above the surface of a feeding location so that the feed in the feed bunk means is accessible to animals or poultry, said suspension means having means to selectively raise and lower the feed bunk means, and drive means for moving the feed bunk means relative to the rail means whereby the feed bunk means moves along its path of movement carrying feed.

2. The feeding apparatus of claim 1 including: rigid strut means extended between and connected to adjacent hanger means,.

3. The feeding apparatus of claim 1 wherein: the rail means comprise a pair of side-by-side members having outwardly directed flanges.

4. The feeding apparatus of claim 3 wherein: the hanger means comprise U-shaped members carrying rollers that ride on the flanges of the rail means and rigid strut means extended between and connected to adjacent hanger means.

5. The feeding apparatus of claim 1 wherein: the feed bunk means comprise generally rectangular bunks.

6. The feeding apparatus of claim 1 wherein: said drive means includes power driven wheel means and elongated flexible means, said flexible means having separate portions connected to separate hanger means.

7. The feeding apparatus of claim 6 wherein: the drive means includes a motor for driving the wheel means and switch means operable in response to the position of the hanger means to reverse the driving direction of the motor, whereby the hanger means are moved in an opposite direction on the rail means.

8. The feeding apparatus of claim 1 wherein: the feed carrying means comprise box-shaped units having open tops and upright ends, and means yieldably connecting adjacent ends.

9. The feeding apparatus of claim 6 including: rigid strut means extended between and connected to adjacent hanger means, said strut means comprising a central tubular member, a plurality of outwardly directed arms secured to the member and longitudinal rod means secured to the arms, said elongated flexible means being located along the central means.

10. The feeding apparatus of claim 1 wherein: the feed carrying means comprise a feed bunk having a generally linear W-shaped trough and hopper means located above the trough for supplying feed to the trough.

11. The feeding apparatus of claim 1 wherein: said means to selectively raise and lower the feed bunk means includes a cable attached to the hanger means and a rotatable shaft for accommodating the cable and a lock means for releasably holding the shaft in a selected position.

12. The feeding apparatus of claim 6 wherein: the rail means comprise laterally spaced rails and the power driven wheel means being located in general vertical alignment with the space between the rails, whereby the flexible member is pulled generally parallel to the longitudinal center line of the rail means.

13. The feeding apparatus of claim 12 including: support means rotatably mounting the wheel means on the rails.

14. The feeding apparatus of claim 13 wherein: said support means are secured to the top of the rails and idler wheels located between and rotatably mounted on the rails for guiding the flexible element to the power driven wheel means.

* * * * *